US007778230B2

(12) United States Patent  
Fulknier et al.

(10) Patent No.: US 7,778,230 B2
(45) Date of Patent: Aug. 17, 2010

(54) MOBILE ROUTER DEVICE

(75) Inventors: John C. Fulknier, Allston, MA (US); Brian J. Smith, Somerville, MA (US)

(73) Assignee: WAAU Inc., Cambridge, MA (US)

(*) Notice: Subject to any disclaimer, the term of this patent is extended or adjusted under 35 U.S.C. 154(b) by 567 days.

(21) Appl. No.: 11/650,634

(22) Filed: Jan. 6, 2007

(65) Prior Publication Data

US 2007/0110017 A1 May 17, 2007

Related U.S. Application Data

(63) Continuation-in-part of application No. 11/497,892, filed on Aug. 2, 2006.

(60) Provisional application No. 60/595,747, filed on Aug. 2, 2005.

(51) Int. Cl.
*H04W 4/00* (2009.01)
(52) U.S. Cl. .................................. 370/338; 370/328
(58) Field of Classification Search .................. 370/338, 370/310.2, 328, 389, 401; 455/422.1, 552.1; 709/203, 208, 209
See application file for complete search history.

(56) References Cited

U.S. PATENT DOCUMENTS

| | | | |
|---|---|---|---|
| 6,252,883 B1 | 6/2001 | Schweickart et al. | |
| 6,253,247 B1 | 6/2001 | Bhaskar et al. | |
| 6,295,276 B1 | 9/2001 | Datta et al. | |
| 6,411,632 B2 | 6/2002 | Lingren et al. | |
| 6,493,341 B1 | 12/2002 | Datta et al. | |
| 6,560,443 B1* | 5/2003 | Vaisanen et al. | 455/73 |
| 6,563,821 B1 | 5/2003 | Hong et al. | |
| 6,636,516 B1* | 10/2003 | Yamano | 370/395.52 |
| 6,757,269 B2* | 6/2004 | Dorenbosch et al. | 370/338 |
| 6,963,579 B2 | 11/2005 | Suri | |
| 7,010,298 B2 | 3/2006 | Seedman et al. | |
| 7,068,624 B1* | 6/2006 | Dantu et al. | 370/331 |
| 7,068,669 B2 | 6/2006 | Abrol et al. | |
| 7,089,312 B2 | 8/2006 | Liu et al. | |
| 7,092,399 B1 | 8/2006 | Cheriton | |
| 7,110,880 B2 | 9/2006 | Breed et al. | |

(Continued)

OTHER PUBLICATIONS

Web page content of Junxion Inc. www.junxion.com printed on Jan. 6, 2007. p. 1-3 product.

(Continued)

*Primary Examiner*—Kent Chang
*Assistant Examiner*—San Htun
(74) *Attorney, Agent, or Firm*—Edward L. Kelley; Invention Management Associates

(57) ABSTRACT

A wireless mobile router (300) includes a CPU (222) and one or more network interfaces for hosting locally reachable devices. The router (300) includes one or more cellular network interface devices (316) configured to make a network connection with a cellular network. The router (300) operates to translate data packets received from locally reachable devices and to direct the translated data packets to public IP address over the cellular network. In addition, a stack of mobile routers (400) includes two or more mobile routers (300) interfaced together to make two or more network connections with a cellular network for increasing bandwidth and for load balancing network traffic passing from the router (300) to the cellular network. The wireless mobile router (300) and the stack (400) are suitable for use in a moving vehicle.

8 Claims, 4 Drawing Sheets

U.S. PATENT DOCUMENTS

| | | |
|---|---|---|
| 7,120,148 B1 | 10/2006 | Batz et al. |
| 7,130,616 B2 | 10/2006 | Junik |
| 7,130,625 B2 | 10/2006 | Akgun et al. |
| 7,133,404 B1 | 11/2006 | Alkhatib et al. |
| 7,136,645 B2 | 11/2006 | Hanson et al. |
| 7,139,841 B1 | 11/2006 | Somasundaram et al. |
| 7,143,169 B1 | 11/2006 | Champagne et al. |
| 2004/0203740 A1* | 10/2004 | Won et al. ............ 455/426.1 |
| 2004/0266348 A1* | 12/2004 | Deshpande et al. ........ 455/41.2 |
| 2006/0114883 A1* | 6/2006 | Mehta et al. ............ 370/352 |

OTHER PUBLICATIONS

Web page content of Junxion Inc. www.junxion.com printed on Jan. 6, 2007. p. 1-2 solution.

Junxion Inc. Field Commander remote management overview dated Oct. 1, 2006 2 pages.

Juxion Box User Guide pp. 3-35 downloaded from www.junxion.com on Jan. 6, 2007.

* cited by examiner

MOBILE ROUTER DEVICE

CROSS REFERENCE TO PRIOR APPLICATIONS

This application is a continuation-in-part of application Ser. No. 11/497,892 entitled MOBILE ROUTER DEVICE, filed Aug. 2, 2006 and claims priority under 35 U.S.C. 119(e) to Provisional Application Ser. No. 60/595,747, entitled INTERNET MOBILE ROUTER DEVICE, filed Aug. 2, 2005, both of which are incorporated herein by reference in their entirety.

BACKGROUND OF THE INVENTION

1. Field of the Invention

The present invention relates to a mobile network router that provides a network interface between locally reachable devices and a cellular network. In particular, the present invention relates to a plurality of mobile network routers stacked together and configured to establish a plurality of network connections with a cellular network.

2. Description of the Related Art

Mobile computer and other mobile electronic device users are increasingly relying on continuous access to Wide Area Networks, (WAN's), such as the world wide web, (www), Internet, Intranets, etc. to access data and software tools and to remain in continuous communication with others, e.g. by email, instant message, telephone, etc. Recently, wireless communication systems utilizing designated radio frequency bands have allowed mobile devices to interconnect with a WAN or the Internet whenever the mobile device is within the usable range of a compatible wireless network.

Conventional wireless local area networks, (WLAN) are often deployed inside structures such as homes, offices and public and commercial buildings for networking with client mobile computers and other client mobile electronic devices. In addition, larger wireless network deployment over a campus or city are also known to network with a large number of client mobile computers and other client mobile electronic devices. Generally a wireless network deployed over a usable range includes a wire network interface to a WAN e.g. through an internet server and Internet Service Provider, (ISP). In these wireless networked areas a client device can usually access a WAN or the Internet through the wire network interface and may have continuous access to the WAN or Internet as needed as long as the client device remains within the usable range of the wireless network.

A typical problem faced by the average WLAN configured client device user is that when the client device leaves a WLAN zone, the client device can not communicate with a network to access network services. This problem has been addressed by cellular network providers and specifically by commercial cellular telephone service providers by providing cell phones and PDA's with access to a WAN or the Internet over a cellular network and by equipping cell phones and PDA's with basic email and web content display and editing functionality. However cell phones and PDA's are not equipped to perform even routine computer tasks and most portable computers are not equipped with cellular network interfacing gear. Accordingly, there is still a need to provide WAN or Internet access to mobile users wishing to perform routine computer tasks in places where network access is not available, e.g. when traveling in a vehicle, watercraft or aircraft or when traveling for work or pleasure.

Generally, cellular networks provide broad or global coverage areas and provide WAN and Internet access and other services to cellular configured client devices. However, there is no convenient way for a WLAN configured client device, e.g. a lap top computer or other portable electronic device to access a cellular network and take advantage of the services provided by the cellular network.

BRIEF SUMMARY OF THE INVENTION

The present invention overcomes the problems cited in the prior art by providing a mobile network router (300) that includes a CPU (222) and memory module (224) configured to performing programs steps for operating a network router and storing one or more routing tables or databases in the memory module for tracking information about data packets received from locally reachable devices and sent to public IP destination address over a cellular network. In particular the cellular network may comprise any cellular network operating the frequency spectral range of 0.8-11 GHz and particularly commercial cellular telephone network operating at 1.9 GHz, public safety cellular networks operating at 4.9 GHz and WiMax networks operating at 2.1 and 5.8 GHz.

The mobile router (300) includes a wireless network interface device (318) in communication with the CPU (222) and configured as a WiFi access point (AP) or other WLAN AP for communicating with locally reachable wireless devices. The mobile router (300) also includes a cellular network interface device (316) in communication with the CPU (222) and configured to communicate with a first cellular network. In one particularly useful embodiment, the cellular network interface device (316) uses a radio frequency band approximately center around 1.9 GHz and the High Speed Downlink Packet Access (HSDPA) communication standard.

The present invention further solves the problems of the prior at by providing methods for operating a network router (300) supporting a plurality of locally reachable devices. Specifically, the router CPU (222) communicates with each locally reachable client device assigns it a local IP address and then builds a routing table for associating each local IP address with each locally reachable client device. The router (300) further operates to establish a network connection with a cellular network over a cellular network interface device (318) connected to the CPU (222) and the cellular network assign the cellular network interface device (318) with a public IP address. The router (300) then receives data packets from locally reachable client devices. Each data packet includes a locally reachable source IP address and a public destination IP address. The CPU (222) then translates each data packet to replace the locally reachable non-routable source IP address with the public IP address assigned by the cellular network. In addition, the CPU assigns a return port to the data packet and inserts the return port ID into the data packet. Thereafter the CPU (222) stores information about each data packets in the routing table stored on the memory device (224). The stored information included the data packet locally reachable source IP address, the data packet destination IP address and the data packet assigned return port. The CPU (222) then transmits the data packet over the first connection with the cellular network.

If a the data packet destination IP address device sends a reply data packet, the packet, the reply data packet is received by the CPU (222) which reads the reply data packet source IP address and the assigned return port and then compares the reply data packet source IP address and the assigned retuned port with the data packet information stored in the routing table to find a matching data packet. Thereafter the reply data packet is translated to replace the destination address with the locally reachable source IP address stored in the routing table and the reply data packet is routed to the locally reachable source IP address.

The present invention further solves the problems of the prior art by providing a stack of wireless network routers (402, 404) interconnected by a network connection between a master router (402) and the slave router (404). The master router (420) includes a first CPU (222) configured to exchange data packets with one or more locally reachable devices. The mater router also includes a first cellular network interface device (316) in communication with the first CPU (222) for establish a first network connection with a cellular network. The slave router (404) includes a second CPU (222) and a second cellular network interface device (316) in communication with the second CPU (222) for establishing a second network connection with the cellular network. The master router and slave router communicate over a network connection to exchange network signals between the first and second CPU. Each router includes program steps stored on the memory for sending data packets received from locally reachable devices over one of the first or second network connections with the cellular network.

BRIEF DESCRIPTION OF THE DRAWINGS

The features of the present invention will best be understood from a detailed description of the invention and a preferred embodiment thereof selected for the purposes of illustration and shown in the accompanying drawing in which.

DETAILED DESCRIPTION OF THE INVENTION

Figure 1:
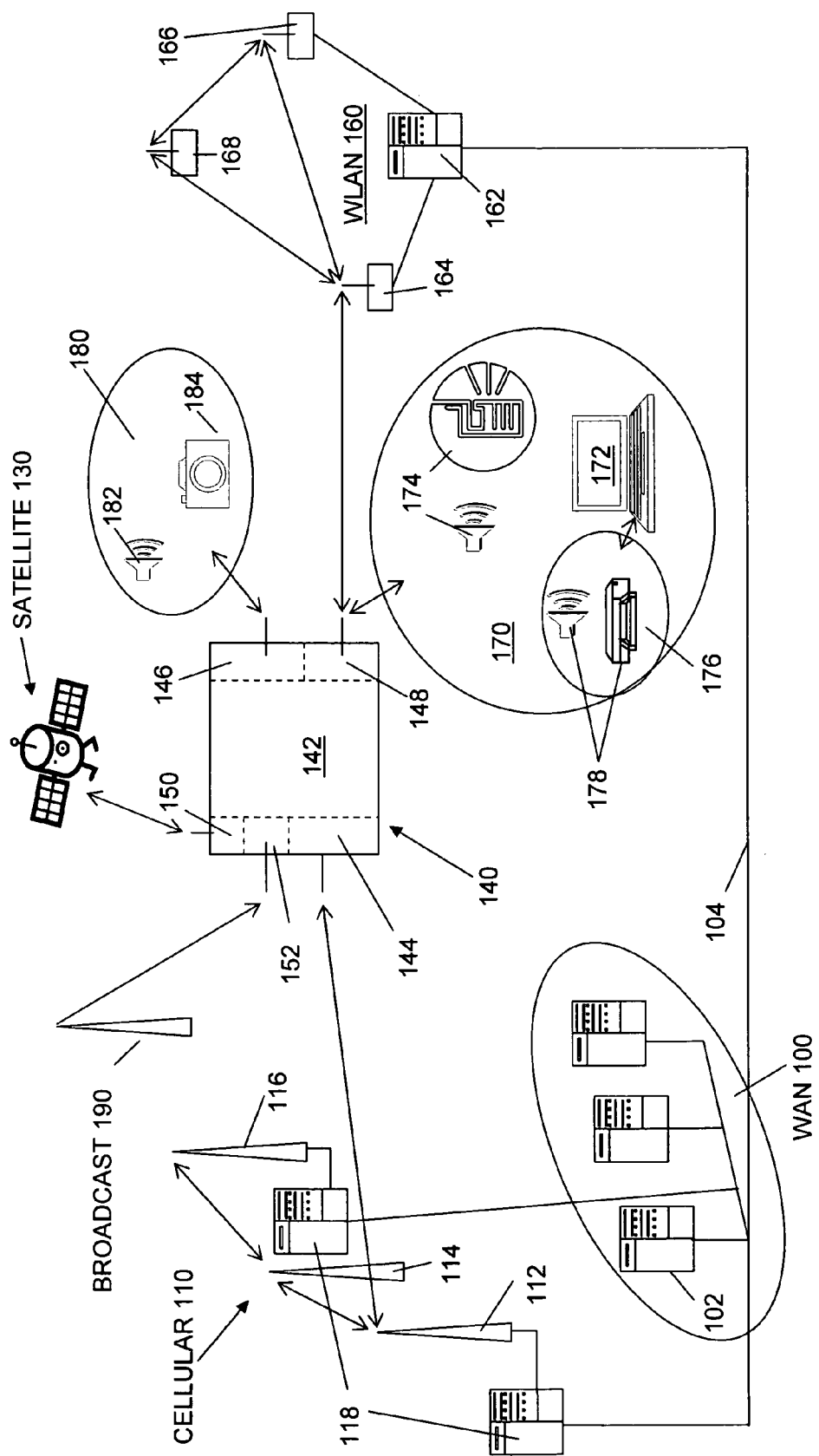
FIG. 1 illustrates a schematic representation of one example of a network environment including a mobile router according to the present invention.

Turning to FIG. 1, one example of a wireless network environment is shown schematically. The network environment includes a wide area network WAN 100, such as the Internet. The WAN generally comprises a plurality of network devices 102, e.g. servers, digital data storage devices, telephone switching gear and network traffic controllers, all interconnected by a wire and sometimes wireless, e.g. microwave, infrastructure 104, such as the world wide web, (www), and other global telecommunications infrastructures. The WAN network 100 comprises a host to many network clients with each network client having a unique network ID such as an Internet Protocol Address, (IP Address), a Uniform Resource Locator, (URL), an email address, a telephone number etc.

Generally communication signals passed over the WAN network 100 include, digital and analog electrical signals generally transmitted through the network infrastructure and generally being communicated from one specific client device to another or from one client device to many specific client devices. The digital and analog signals may include a telephone call between two users, an email sent from one client device to one or more other client devices or a client browser request to access to a particular server or network client device to exchange data files there between.

Generally, network interface elements are included local to or incorporated within each client device. In addition, the WAN 100 and infrastructure 104 includes various network interface elements such as switches, hubs, routers etc. Network interface elements are used to format network signals, to associate a network address to a client device network, and generally to allow network signals to be exchanged between client devices of many types and configurations. A common wire network interface element is the Ethernet interface module installed in many client devices. An Ethernet interface module generally operates according to the IEEE standard 802.3 to divide data into frames or packets and format the frames according to a communication protocol such as the Transmission Control Internet Protocol, (TCP/IP). Of course other wire network interface device types are also in use and usable with the present invention.

In addition, the WAN 100 includes network control elements configured to interface with the infrastructure 104 and with other host networks, to direct network traffic, to control access to the network, to measure network parameters etc. Typical WAN network control elements comprise network servers configured to establish a host/client relationship with many thousands of client devices and to manage signal exchanges there between.

The network environment also includes a cellular network, generally 110. The cellular network 110 comprises a plurality of wireless network access points, 112, 114, 116 configured as radio transceivers. In the example of FIG. 1, a first access point comprises a base station 112. Generally the base station 112 is in communication with a cellular network controller or router 118. The network controller 118 may comprise a computer or server positioned local to the base station 112 and connected to the WAN 100 via a wire or microwave link. Alternately, the base station 112 may be connected to the WAN via a wire or microwave link and the network controller or router 118 may reside anywhere on the WAN 100. In addition, each cellular access point 112, 114, 116 exchanges wireless signals with other cellular access points to communicate with the base station 112 and network controller 118.

The cellular network controller 118 controls communication traffic on the cellular network. In particular, the cellular network is a host network having a plurality of client devices. The cellular network controller 118 controls the network traffic to each client device and may provide different network services to different client devices. In addition, the cellular network controller 118 may provide a cellular network client device with access to the WAN 100.

Generally, cellular network access points 112, 114, 116, (cell towers), comprise one or more radio transceivers, usually elevated above the ground, capable of providing cellular network coverage over a useful range. Each cellular access point may communicate with a plurality of cellular client devices such as any device configured according to the cellular network standards, such that each cellular client device located within the useful range of an access point is able to exchange signals with the cellular network and if needed a WAN. Moreover, the cellular network useful range may extend over a very wide area when the base station 112 and other access points 114, 116 are configured to exchange radio signals with adjacent access points to thereby relay radio signals between the base station 112 and every other cell sight 114, 116. Accordingly, the cellular network provides a wireless communication infrastructure for communicating with a plurality of wireless client devices disposed within the useful range of any cellular access point and for connecting each client wireless device to a WAN 100.

Generally, a cellular network is configured to operate using radio frequencies ranging from about 0.8-2.2 GHz or using microwave frequencies ranging from about 2.2-11.0 GHz. In addition, a cellular network is configured to operate using a cellular network message exchange or communication protocol standard such as any one of the Global System for Mobile Communications (GSM), General Packet Radio Service (GPRS), Universal Mobile Telecommunications System (UMTS), High-Speed Downlink Packet Access (HSDPA), High-Speed Uplink Packet Access (HSUPA), Code Division Multiple Access (CDMA), Evolution-Data Optimized (EVDO), Enhanced Data Rates for GSM Evolution (EDGE), 3GSM, Digital Enhanced Cordless Telecommunications (DECT), Digital AMPS (IS-136/TDMA), or Integrated Digital Enhanced Network (iDEN), etc.

In practice, different cellular network providers use different radio frequency bands and or different network exchange or communication protocol standards. However, it is typical that a single cell tower may include a plurality of cellular access points each using a different radio frequency band and or a different network exchange or communication protocol standard such that the cellular network 110 may actually comprise a plurality of cellular networks operating in the same region. Conversely, a typical cellular client device, e.g. a cell phone or PDA includes a network interface device configured to communicate with only one type of cellular network. In addition, each cellular client device is generally assigned a unique device ID, e.g. a phone number, IP address, or the like, to uniquely identify the device and to establish a one to one communication link between the cellular client device and another device via the access point and cellular network controller 118.

The wireless network environment may also include a Satellite Telecommunication Network, (STN) generally 130. The STN includes a ground-based base station and network controller, not shown, and at least one orbiting satellite access point configured with a transceiver for exchanging electromagnetic signals between the STN network controller and the satellite. In addition, the satellite may transmit broadcast signals to ground based client devices or may exchange two way communication signals with ground based STN configured client devices. In one example, an STN may comprise the global position system, (GPS) used to transmit wireless signals from satellites to ground-based STN configured signal receivers for allowing each ground-based STN signal receiver to calculate its position. Alternately, the STN may comprise one or more television or radio broadcast satellites configured to broadcast digitized television and radio, or any other digitized video and or audio signals, over a wide area to ground based STN configured client device receivers. In addition, STN-configured client telephone and video phone devices are able to connect with other telephone/videophone exchanges through the ground-based STN network controller. In addition, the ground-based STN network controller may be in communication with the wire infrastructure 104 and the WAN 100 such that a ground-based STN-configured client device may gain access to a WAN 100 via a satellite transmission. As with other networks, the STN controller may control access to the STN network.

The network environment may also include one or more substantially permanent wireless local area networks, (WLAN) 160. Generally a permanent WLAN 160 comprises a wireless network access point formed at a base station 164. The permanent WLAN 160 may also comprise additional wireless access points 166 and 168 disposed to extend the useable range of the WLAN 160 and configured to communicate with the base station 164 using wireless and or wire connections to relay network signals to every access point 164, 166, 168. Each access point 164, 166, 168 includes a wireless transceiver configured to exchange communication signals with WLAN configured client devices and with other WLAN access points.

The base station 164 may include a network controller configured to host WLAN configured client devices. The network controller functions as a network router to assign each client device a network address and to control network traffic between the host base station 164 and client devices. The base station 164 usually connects with a server 162, which may also form the network controller, and the server 162 connects with the local wire infrastructure 104 to provide each client device with access to the WAN 100. Generally a permanent WLAN 160 may be installed inside a structure to provide wireless network access over the entire structure or a portion thereof. In the example network environment, the WLAN 160 is based on the Wi-Fi or IEEE 802.11 communication standard which defines how signals are to be formatted and communicated using radio wave frequencies in the range of 2.4-2.5 GHz and or 5.15-5.8 GHz.

In addition to the above listed networks, the network environment may further include a plurality of traditional public radio and television broadcast networks as well as a plurality of two-way radio voice and pager networks all generally represented by the network access point 190. In particular, the network access point 190 may comprise broadcast signals able to be received by properly configured radio or television signal receivers located within the usable network range, or the network access point 190 may comprise one or more transceivers used for two-way radio communication by military, municipal, corporate, and private radio network providers to communicate with any properly configured signal transceiver located within the usable network range. Generally the network access point 190 includes broadcast signals such as free radio, and television broadcast signals pay radio and television broadcast signals, selected two-way radio communication bands and various special purpose radio networks.

Mobile Router Interface Devices

According to the present invention, a mobile router 140 comprises a stand alone wireless network interface device configured to operate in the above described network environment. In particular, the mobile router 140 is configured to operate in a moving vehicle and to access one or more cellular network access points as the vehicle traverses over a network environment. More specifically, the mobile router 140 is configured to seek a cellular access point, to gain access to a cellular network and to become a client of the cellular network. Once the mobile router is a client of the cellular network, the mobile router is configured to exchange network signals with the cellular network. In particular, the mobile router 140 may be configured to become a client of one or more cellular networks simultaneously.

The mobile router 140 is further configured as a wireless network access point configured to host one or more wireless network configured devices in a wireless local area network WLAN. The WLAN may be established inside a vehicle or local to the mobile router 140. The mobile router 140 comprises a WLAN controller forming a WLAN base station or access point configured to communicate with one or more compatibly configured WLAN client devices. Thus according to the present invention, the mobile router 140 comprises a client device on a cellular network or on a plurality of cellular networks and a host device communicating with one or more client devices on a WLAN. Generally, the cellular network comprises a substantially permanent wireless wide area network WWAN covering a large geographic region, while the WLAN is temporary and may be movable with the mobile router 140, e.g. in a moving vehicle.

The mobile router 140 is configured to exchange first network signals with the cellular network or plurality of cellular networks and to exchange second network signals with one or more second client devices on the WLAN. Moreover, the mobile router 140 comprises an interface between two or more wireless networks operating on different network communication standards. More specifically, the mobile router 140 comprises an interface between a WWAN and a WLAN.

As shown in FIG. 1, the mobile router 140 includes a controller 142, and one or more wireless network interface devices, 144, 146, 148, 150, 152 in communication with the controller 142. Generally the network interfaces devices shown in FIG. 1 are each configured to communicate with a different wireless network type and to deliver network signals originating in each different network type to the controller 142.

Each network interface device 144, 146, 148, 150, 152 comprises an antenna configured to receive analog electromagnetic wave signals in a particular frequency range and a receiver configured to convert the analog electromagnetic wave signals received into digital signals formatted as required for delivery to the controller 142. The receiver may also include a signal amplifier incorporated in the antenna, incorporated in the mobile router 140 or installed between the antenna 232 and the router 140.

Some or all of the network interface devices, 144, 146, 148, 150, and 152 also include a signal transmitter configured to transmit analog electromagnetic wave signals in a particular frequency range and with a desired signal power amplitude through the antenna. Each signal transmitter is configured to receive digital signals from the controller 142 and to convert the digital signals into analog electromagnetic wave signals in a particular frequency range and formatted as required for radio transmission to another signal receiver. The transmitter may also include a signal amplifier incorporated in the antenna, incorporated in the mobile router 140 or installed between the antenna and the router 140.

In some instances, an entire network interface device 144, 146, 148, 150, 152 may be disposed external to the wireless router 140 and interfaced with the wireless router by a wire connection passing through an input output I/O interface device. Alternately, network interface device may communicate with the router 140 through another wireless interface device included in the mobile router 140. In particular some vehicles may be equipped with built-in antennas, GPS receivers, satellite radio and television receivers etc. and these elements may be used to interface with the mobile router 140 by wire or wireless connection to deliver network services to the router 140 for routing to client devices connected to the router 140.

Generally, the router controller 142 exchanges control, communication and power signals with each network interface device 144, 146, 148, 150, 152. The controller 142 may also receive a network data packet over a first network interface device, e.g. 148 reconfigure the network data packet and transmit the reconfigured network packet over a second network interface device, e.g. 144.

In one example according to the present invention, a first network interface device 144 may comprise a cellular network interface device configured to communicate with a cellular network 110. In particular, the network interface device 144 exchanges signals with one or more cellular network access points 112, 114, 116, gains access to become a client of the cellular network 110, and if possible uses services of the cellular network 110 to gain access to the WAN 100, to utilize various network services such viewing web pages, exchanging emails, exchanging vice data, etc.

A second network interface device 148 may comprise a WLAN interface device configured to establish a WLAN network 170. In particular, the network interface device 148 exchanges comprises a WLAN access point, (AP) used to establish a WLAN network 170 having network clients 172-178.

A third network interface device 146 may comprise a personal area network, PAN, interface device configured to establish a PAN network 180 and to communicate with PAN network configured devices 182, 184. In particular, the third network device 146 is configured to host client devices operating on one of the Bluetooth, Ultra-Wide-Band (UWB) or other PAN network communication standards.

A fourth wireless network interface device 150 comprises an STN interface device configured to communicate with an STN network or network device 130. In particular, the network interface device 150 exchanges signals with the STN network access point, e.g. the satellite 130, to gain access to and become a client of the STN network 130, and if possible to gain access to services of the STN 130, e.g. to gain access to the WAN 100, for telephone and video conferencing, to access audio and video content, to determine GPS coordinates, etc.

A fifth wireless network interface device 152 may comprise one or more other wireless receivers or transceivers configured to communicate with two-way radio or pager networks or configured to receive radio and television broadcast channels from the access point 190 in FIG. 1. For example the network interface device 152 may comprise a tunable receiver for manually or automatically scanning or otherwise adjusting to receive an analog electromagnetic signal of a desired frequency, e.g. a conventional AM radio signal in the frequency range of 525 kHz to 1715 kHz or conventional FM radio and television signals in the frequency range of 30 MHz to 400 MHz, or another broadcast signal. Alternately, the network interface device 152 may comprise a tunable transceiver for exchanging two-way radio communication signals over a desired radio band e.g. a military, marine, municipal, citizen band, corporate, and amateur or other two-way radio network at selected frequencies.

In addition the mobile router 140 may include still further network interface devices configured for any other specialized wireless network communication such as Radio Frequency Identification, (RFID), infrared telecommunication bands, visible telecommunication bands such as laser emitters and receivers an any other wireless communication device. In addition, the mobile router 140 may also include one or more wire network interface devices such as an Ethernet interface device for interfacing with a wired network such as a local area network LAN when one is available.

Mobile Router Client Device

Further according to the present invention, the mobile router 140 comprises a host network device for hosting one or more client devices. In particular, the WLAN interface device 148 includes a transceiver configured to communicate with WLAN configured client devices 172, 174 and to exchange WLAN configured network signals therewith. In addition, the controller 142 is configured as a WLAN network controller and router for accepting client devices onto the WLAN network designated 170, and controlling communication traffic to each client device therein, 172, 174. In addition the controller 142 is configured to receive a communication signal from a WLAN configured client device, e.g. a data packet and to reconfigure the data packet for transmission to a cellular network 110 over the cellular network interface device 144. Conversely, the controller 142 is configured to receive a reply communication signal, e.g. a return data packet, from the cellular network 110 and to reconfigure the return data packet for transmission to a originating WLAN configured client device. As shown in FIG. 1 the WLAN 170 includes a WLAN configured lap top computer 172, and WLAN configured speaker and telephone 174, however, the WLAN clients may include any computer or computer peripheral device or video displays, PDA's, printers, scanners, faxes, memory devices, etc. Generally the WLAN may operate according to one or more of the Wi-Fi, IEEE 802.11, WiMax, IEEE 802.16, wireless Ethernet IEEE 802.3, or any other WLAN communications standards.

In addition, the WLAN configured client device 172 may comprise a network access point for a PAN network 176 which includes PAN configured client devices 178 such as audio speakers or headsets, PDA's, key board, mouse, printer, scanner etc.

In addition or alternately, the PAN network interface device 146 includes a transceiver configured to communicate with PAN configured client devices and to form a PAN network 180 to exchange signals with PAN configured client devices 182, 184 as well as PAN configured devices 176 and 178. In addition, the controller 142 is configured as a PAN network controller and router for accepting client devices onto the PAN network 180 and controlling communication traffic to each client device, 182, and 184. In addition the controller 142 is configured to receive a communication signal from a PAN configured client device, e.g. a data packet and to reconfigure the data packet for transmission over the cellular network 110 or over any other network locally reachable by the mobile router 140. Conversely, the controller 142 is configured to receive a reply data packet from the cellular network 110 or any other network that is locally reachable by the mobile router 140 and to reconfigure the replay data packet for transmission to a PAN configured client device, e.g. 182, 184. Generally the PAN network 180 may operate according to one or more of the Bluetooth, IEEE 802.15.1, ZigBee, IEEE 802.15.4, Ultra Wide Band, UMB, IEEE.802.15.3a or any other PAN communications standards.

The Network Controller

Figure 2:
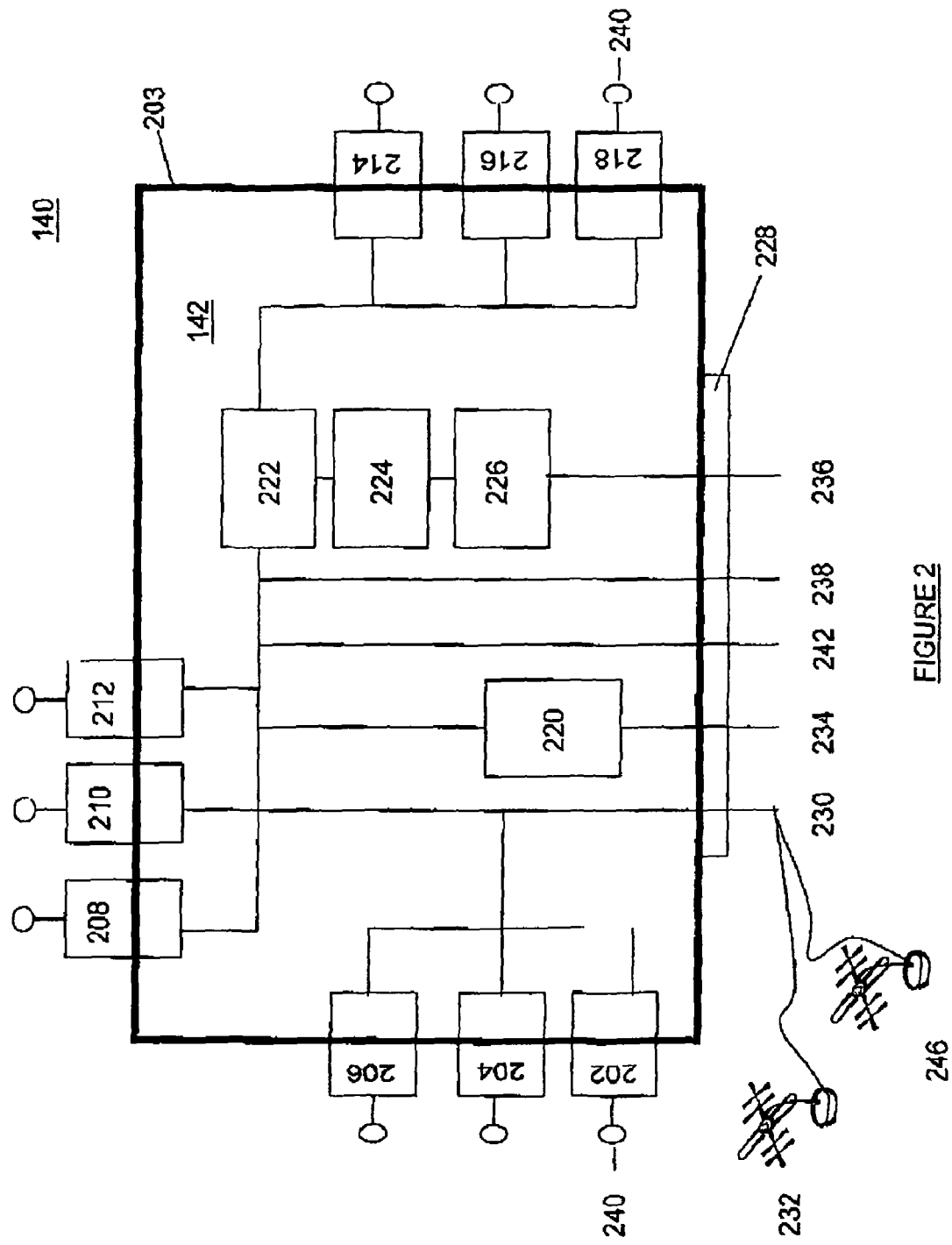
FIG. 2 illustrates a schematic representation of one example of a mobile router according to the present invention.

Turning now to FIG. 2 a mobile router 140 according to the present invention comprises a controller 142 configured as a printed circuit board or mother board having various integrated circuit elements formed thereon and attached thereto. The mobile router 140 also includes a plurality of network interface devices, 202, 204, 206, 208, 210, 212, 214, 216, 218 and 220 interfaced with the controller 142 and in communication with the CPU 222. Generally the controller 142 and each of the network interface devices 202-220 are housed within a conventional electronic module enclosure 203 configured to protect the enclosed elements from contaminates, mechanical damage, including shock, moisture, electromagnetic emissions, electrical shock, and other hazards, as well as to serve as a common ground plane, all as is well known in the art. Generally, a network interface device 202-220 may be configured in a number of different embodiments depending on the availability and complexity of the interface device. However, the network interface devices may comprise any one of the following configurations including a combination of more than one configuration. A separate printed circuit board, such as a daughter board attached to the controller 142. Printed and additional circuit elements formed integral with the controller motherboard. Circuit elements contained within a central microprocessor unit, (CPU) 222. A Portable Computer, (PC), card installed within a card slot provided through the enclosure 203 and interfaced with the controller 142 by a card slot interface. An external device communicating with the controller 142 over a serial or network interface.

The controller 142 includes a conventional digital microprocessor or CPU 222, e.g. offered by INTEL Corp, AMD Corp. MIPS Corp. etc. Alternately the CPU 222 may be a conventional Network Storage Processor or the like, specifically configured for network data processing. The controller 142 includes one or more digital memory modules 224 in communication with the microprocessor 222 for storing digital data and program instructions therein. The memory modules 224 may include one or more of various memory types such as random access memory, (RAM), read only memory ROM, FLASH ROM, various removable or permanent disk memories etc., and the memory modules 224 may be mounted on the controller 142, installed as PC cards or otherwise contained within or associated with the enclosure 203, including external devices communicating with the controller 142.

The controller 142 further includes a power module 226 for controlling the distribution of power throughout the mobile router 140. The power module 226 may be connected to an external power source e.g. a conventional AC wall outlet or a conventional 6, 12, 40 or other volt vehicle power outlet, or any other external power source that is suitably configure to deliver power to the power module 226, or the power module 226 may include internal power source elements, e.g. a battery, fuel cell battery charging circuit etc. Generally the power module interfaces with the microprocessor 222 and with each element of the mobile router 140 through the controller PC board to deliver and control power as needed, and if desired to include power saving functionality such as selecting a different power source, reducing power consumption, activating power in response to various inputs etc.. all in accordance with predefined power controlling software controlling parameters.

The mobile router 142 further includes a conventional wire connecting input output I/O interface 228. The I/O interface 228 includes a plurality of wire connectors supported by the enclosure 203 for connecting and communicating with external devices. In particular, the I/O interface 228 includes one or more antenna interfaces 230. Each antenna interface 230 connects with an external antenna 232 or 246 specifically tuned as an electromagnetic or magnetic wave receiving and transmitting device for a desired wireless communication channel or frequency range and configured to produce an analog electrical signal in response to electromagnetic or magnetic waves being received thereby or to emit electromagnetic or magnetic waves in response to an analog electrical signal. In addition, the external antennas 232 and 246 or antenna interfaces 230 may include a signal amplifier for amplifying the analog electrical signal produced by or delivered to the antenna. In addition, each wire connected between the external antenna 232 and a wireless network interface element 202-218 is preferably configured to shield and properly ground the antenna analog signals from external interference and disturbance.

The I/O interface 228 may also include a wire network interface 234 including one or more wired network connectors for connecting the mobile router 140 directly to a wired network such as a local area network, LAN or wide area network WAN or to any other wire network configured device including a computer, server, data storage device, PDA, printer, scanner, video display device, audio playback system, camera, telephone, router, wireless network access point, external antenna, modem, etc. In one example, the wired network interface device 234 is an Ethernet network interface and the mobile router 140 includes an Ethernet network interface device 220. The Ethernet interface device 220 may comprise a PC card in a card slot; a circuit formed on the controller PC board 142 or may be incorporated within the CPU 222.

Additionally, the mobile router 140 may also have universal serial bus (USB), Firewire (IEEE 1394), IDE, Serial-ATA interface devices which provide for interfacing to local data storage devices (disks) or other peripherals. Serial RS232/422/485 and General Purpose Interface Bus, (GPIB) (IEE488) interface devices can interface with other peripherals and the data to and from these networks can be routed to and from any other connecting network. Furthermore, local peripherals for control and setting of the mobile router or for user input/output may exist. These may include speaker outputs, a video screen, a microphone, or a user-control (buttons, etc.) on the router itself. All of these peripherals can be routed to any of the other networks as well. (For instance, audio or video data from any network can go to the local peripheral in addition to being routed to attached network devices.)

The I/O interface 228 includes one or more external power input connectors 236 for connecting to external power sources. The I/O interface 228 may include one or more wire ports 238 configured for serial or parallel communications between the CPU 222 and an external device, e.g. using an USB or RS232 serial communication technique. The communication ports 238 may be used to interface with a computer, server, data storage device, PDA, printer, scanner, video display device, audio playback system, camera, telephone, router, wireless network access point, external antenna, modem etc. The I/O interface 228 may also include one or more analog or digital wire ports 242 configured for connecting with an audio, video, telephone, or other devices as may be required to exchange analog or digital signals therewith.

Generally each wireless network interface devices 202-218 includes an integral antenna 240 or an external antenna 232. The antenna is configured to receive and or transmit or emit electromagnetic waves of a particular radio or microwave frequency. Each wireless network interface device 202-218 at least includes a receiver associated with the antenna for converting antenna signals into analog electrical signals and for converting the analog electrical signals into digital signals readable by the CPU 222. In addition, each wireless network interface device 202-218 may include a transmitter associated with the antenna for converting digital signals received from the CPU 222 into analog electrical signals delivered to the antenna to generate electromagnetic or magnetic wave signals and to transmit or emit the analog electromagnetic or magnetic wave signals into the surrounding area. In addition some wireless network interface devices 202-218 may be configured as tunable transceivers for tuning to a desired frequency for receiving various radio, television or microwave channels such as a radio or television stations or to select a two-way radio band. In other examples a tunable transceiver may be used to change cellular networks or to change WLAN networks.

In one example of a mobile router 140 according to the present invention, one or more network interface devices 202, 204, 206 are configured as cellular network interface devices for exchanging electromagnetic wave signals with cellular network access points, e.g. 112, 114, 116 in FIG. 1, and for becoming a client device on a cellular network. In addition, one or more network interface devices 214, 216, 218 are configured as wireless local area network WLAN or as personal area network PAN access points for exchanging electromagnetic signals with one or more client devices configured to communicate with a WLAN or PAN access point or for becoming a client device on a WLAN or PAN network. In addition, one or more wireless network interface devices 208, 210 and 212 are configured to communicate with a satellite, (STN, GPS), radio, (AM/FM, two-way), television, infrared, or any other wireless network available.

In a preferred embodiment the mobile router 140 comprises a first network interface device 202 comprising a 1x Evolution-Data Optimized, EVDO/1xRTT or just EVDO configured cellular PC card installed in a card slot connected to the network controller 142. In addition the EVDO configured interface device 202 is connected to an external 1.9 GHz PCS antenna 232 through a low loss microwave cable and bulkhead grommet. The EVDO cellular interface is a Code Division Multiple Access, (CDMA) wireless broadband data interface standard used by a large number of cellular network service provides and access to a cellular network over the EVDO configured interface device 202 is generally available wherever cellular access points are available.

In addition the preferred mobile router 140 comprises a second network interface device 218 comprising a wireless fidelity, Wi-Fi configured device for communicating with Wi-Fi configured client devices. The Wi-Fi or IEEE 802.11 communication standard and network architecture is used by many wireless local area network WLAN configured devices and its use is expanding to other devices such that most wireless network configured devices will be able to communicate with the Wi-Fi interface device 218.

Generally, the preferred embodiment described above operates as follows. Upon power up, the CPU 222 communicates with the first wireless network interface device 202 to initiate a search for available EVDO configured cellular network access points and selects an optimal cellular access point to communicate with. The CPU 222 may then initiate an action to make the mobile router a client on the host EVDO configured cellular network 110 and to access services provided by the cellular network 110. In addition, the CPU 222 communicates with the second wireless interface device 218 to establish a WLAN 170 over a usable range and to initiate a search for available Wi-Fi configured client devices 172, 174 located within the usable range. Upon finding Wi-Fi devices, 172, 174, the CPU 222 assigns a Wi-Fi address to each device and communicates to each client device that a network access point is available.

Thereafter, each Wi-Fi client device 172, 174 may communicate with the Wi-Fi interface device 218 using Wi-Fi network signals, e.g. to initiate a connection with the WAN 100. The Wi-Fi network signals are received by the wireless network interface device 218, converted to digital signals readable by the CPU 222 and reconfigured by the CPU 222 and routed to the EVDO cellular network interface device 202 to be converted to analog radio signals and sent to the cellular network 110, and eventually the WAN 100. Upon receiving a return signal from the WAN 100 and cellular network 110 in an EVDO format, the first wireless network interface device 202 converts the analog EVDO signal to a digital signal readable by the CPU 222 and the CPU 222 converts the return signal to a Wi-Fi signal and sends the return Wi-Fi signal to the designated wireless client device 172 or 174.

Thus according to one aspect of the present invention, the mobile router 140 acts as a wireless network signal converting device for converting a Wi-Fi formatted wireless signal to an EVDO formatted wireless signal and for converting an EVDO formatted wireless signal to a Wi-Fi formatted wireless signal.

In further aspects of operating the preferred mobile router 140, the CPU 222 is programmed to periodically update information about the wireless network environment by repeatedly checking the availability of a more desirable cellular access point and by repeatedly checking the status of client devices in the WLAN area 170. This is done to make sure the mobile router 140 stays continuously connected to the EVDO cellular network even as the mobile router moves with respect to the wireless environment. In addition, the wireless router 140 is programmed to repeatedly send update messages to the cellular network to ensure that host device does not terminate the client device connection due to inactivity. In addition, the wireless router 140 is programmed to perform cellular network access point hand offs without losing a connection with the host cellular network. In particular this is accomplished by continuously communicating with two more cellular access points to hand off communications to the best available access point or if warranted to divide communication traffic between two or more cellular access points to increase bandwidth or improve reliability as may be required.

Generally the preferred EVDO mobile router 140 including the external antenna 232 is capable of maintaining a continuous connection with a cellular network over most of the network environment. In particular, the external cellular antenna 232, especially when used with a signal amplifier has a range of approximately 30 miles, which is significantly better than the range of an average cell phone or PDA which is typically 0.5-8.0 miles. In addition, the external antenna interface 230 is easily connected with a built-in vehicle, water craft, or aircraft when the mobile router 140 is being used therein.

In addition, the mobile router 140 may also include an external Wi-Fi antenna 246 optimized for 2.4 GHz signals and optionally including a signal amplifier to increase the usable range of the Wi-Fi network 170 and to gain access to another Wi-Fi network e.g. WLAN 160. In one particularly useful application of the mobile router 140 configured with an external Wi-Fi antenna 246, the router 140 may be used to access and become a client on a nearby Wi-Fi configured WLAN 160 and to gain access to a WAN 100 through the WLAN 160. In this case, the usable range of the network interface device 218 configured with a Wi-Fi optimized external antenna 246 will usually exceed the range of the client devices 172 and 174 which do not generally include a separate external Wi-Fi antenna. Thus the mobile router 140 may become a client device the WLAN 160 and exchange Wi-Fi signals directly between the client devices disposed within the WLAN 170 and the WLAN 160. The above described use of the mobile router 140 is particularly useful when the only available cellular network is a pay per use service and the WLAN 160 provides non-pay network access. To take advantage of this situation, the controller 142 is programmed to review all available wireless network access points and to select the best available notwithstanding the network type.

In further embodiments of the mobile router 140, additional cellular network interface devices 204 and 206 may be added to increase the type of cellular networks that can be accessed. Specifically, each cellular network interface device 202, 204, 206 may be configured to communicate with a different cellular network type to increase the likelihood that continuous cellular network access can be maintained. For example the device 202 is configured as a High Speed Downlink Packet Access (HSDPA) standard cellular interface device for communicating with one or more HSDPA configured networks. The device 204 is configured as an Enhanced Data rates for GSM Evolution, or EDGE interface device for communicating with one or more EDGE configured cellular networks. The device 206 is configured as another cellular interface device as may be required to communicate with another cellular network type including any one of, or a combination of, the Global System for Mobile Communications (GSM), General Packet Radio Service (GPRS), Code Division Multiple Access (CDMA), 3GSM, Digital Enhanced Cordless Telecommunications (DECT), Digital AMPS (IS-136/TDMA), and Integrated Digital Enhanced Network (iDEN) cellular network configurations.

In further embodiments of the mobile router 140, additional cellular network interface devices 204 and 206 may be added to increase the number of cellular network connections that can be established, e.g. to increase the communication bandwidth capacity between the mobile router 140 and the cellular network 110. In this example, each of the cellular network interface devices 202, 204, 206 may comprise an HSDPA configured device and each of the HSDPA configured devices can be configured to act as a separate client device on the host cellular network to increase bandwidth. Moreover, each HSDAP device may have a different cellular network identity and each device may have a different set of cellular network service options.

In further embodiments of the mobile router 140 variously configured wireless network interface devices 214, 216, 218 may be used to establish various wireless local area networks, e.g. 170, 180 and others to communicate with devices of various wireless network configurations. In addition, two or more wireless network interfaces 214, 216, 218 may be configured as a single type network device to increase communication bandwidth and or to increase the number of client device that can be supported. Specifically the wireless interface devices 214, 216, 218 may be configured according to any one of the Wi-Fi, IEEE 802.11, Bluetooth, IEEE 802.15, WiMax, IEEE 802.16 Home RF, Ultra Wide Band, UWB, Zigbee, IEEE 802.15.4, or other wireless networks standards or protocols.

In addition, the controller 142 may be configured to operate in various network environments such as a Mobile ad-hoc Network (MANET), a peer to peer, P2P networks, a mesh network, an infrared sensor network, or other network type and exchange signals from one network type to another as described above.

Figure 3:
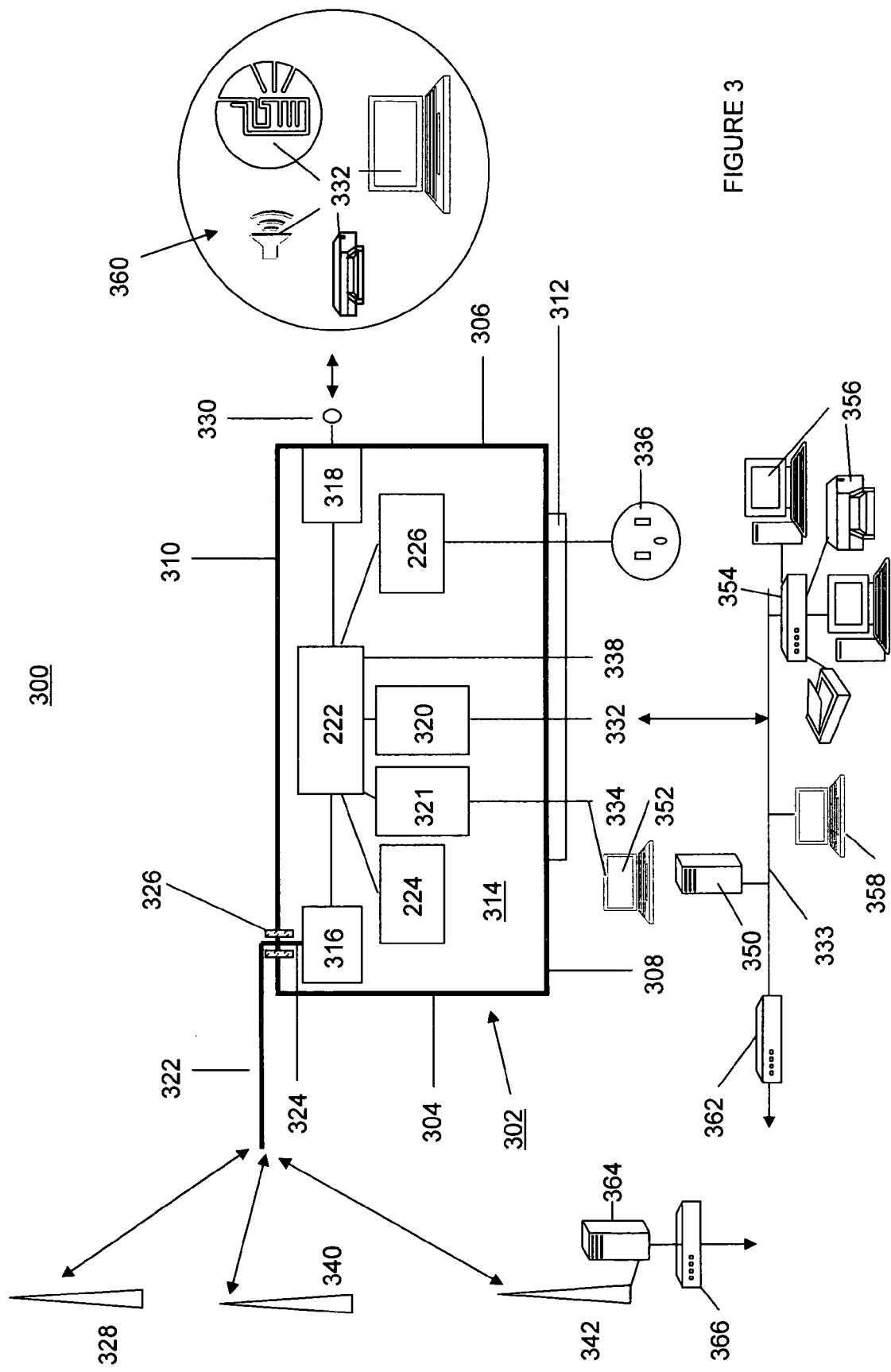
FIG. 3 illustrates a schematic representation of a preferred mobile router configuration according to one aspect of the present invention.

Referring to FIG. 3 a preferred embodiment of a mobile router 300 according to one aspect of the present invention is shown schematically. The mobile router 300 includes a printed circuit (PC) board 314 formed with wire buses and associated surface mounted connectors and circuit elements disposed thereon and arranged to distribute and exchange analog, digital and power signals as required to function as a network router. The PC board 314 may be housed in a conventional electronic enclose having side walls 304, 306, 308 and 310 as well as opposing top and bottom walls not shown. The mobile router 300 includes an I/O interface module 312 comprising a plurality of connectors, generally supported on the PC board 314 and extending through the side wall 308, for receiving wire connector elements therein. The I/O interface module 312 includes two Ethernet wire network connectors 332 and 334, a power connector 336, (e.g. for receiving AC and or DC power input), and other wire and or optical connectors 338 as may be required. The other wire connectors may include wire or optical ports for exchanging signals with another device including serial, parallel or other network data ports for exchanging audio, video text or graphic content with another device.

The router PC board 314 includes a programmable central microprocessor unit, (CPU) 222, a memory module 224, in communication with the CPU 222, and a power module 226 configured to receive input power from the power connector 336 and to deliver power to the CPU 222, and to other internal, or externally connected, components as may be required. The power module 226 may also comprise a battery or other self contained power generating or power storage elements.

In a preferred embodiment, the router 300 includes one cellular wireless network interface device 316 configured to exchange radio network signals between a cell site, such as a cellular telephone network cell tower, (328, 340, 342), and the CPU 222. The preferred router 300 also includes two wire network interface devices 320 and 321, each configured to exchange network signals between a wire network or wire network configured device, e.g. a LAN 333 or a portable computer (PC) 352, and the CPU 222.

In another embodiment, the router 300 may only include two network interface devices, the cellular wireless network interface device 316 and any one of the WLAN wireless network interface device 316 or wire network interface device 320 or 321. Alternately, the router 300 may include four network interface devices 316, 318, 320 and 321 while only being connected to two or three networks, or while only exchanging network traffic between two or three networks unless there is a need to reroute network traffic to the third or fourth network. In a particularly preferred embodiment, the WLAN wireless network interface device 316 comprises a WiFi configured wireless access point (AP) and each of the wire network interface devices 320, 321 comprises wire Ethernet network internet device configured as an Ethernet network node.

In a first application, the wireless router 300 serves as an interface between a WiFi network 360 and a cellular network. In this application, the mobile router 300 is particularly useful for providing an interface between one or more isolated WiFi client devices 332 and a cellular network to provide the WiFi client devices 332 with Internet or WAN access over the cellular network. Applicants have found that the wireless router 300 is particular useful in a moving vehicle for exchanging network traffic between WiFi configured client devices inside the vehicle and destination public IP addresses available over a cellular network. In another example, the wireless router 300 operating as a WiFi AP in otherwise non-WiFi covered areas is usable for exchanging network traffic between WiFi configured client devices located within about 100 meters of the router 300 and destination public IP addresses available over a cellular network. This application is particularly useful for establishing a temporary WLAN such as at a trade show, or at a temporary office or work space.

In a second application, the wireless router 300 serves as an interface between one or both of the two wire network interface devices 320 and 321 and a cellular network. In this application, the mobile router 300 is particularly useful for providing an interface between one or more isolated Ethernet configured client devices and a cellular network to provide Ethernet configured client devices with Internet or WAN access over the cellular network. Applicants have found that the wireless router 300 is particular useful in a moving vehicle for exchanging network traffic between on or two a wire Ethernet configured client device, e.g. PC 352, plugged into the Ethernet connectors 332 and or 334 and destination public IP addresses available over a cellular network.

In another example, the mobile router 300 may be installed as a node on a LAN 333 and used to exchange network traffic between any node or client device on the LAN 333 and destination public IP addresses available over a cellular network. This application is particularly useful for establishing a temporary LAN such as at a trade show, or at a temporary office or work space.

In a third application the wireless router 300 serves as an interface between the WiFi network 360, the LAN 333, a single wire network configured device PC 352 and a cellular network. In the example of FIG. 3, a wire Ethernet LAN 333 may be connected to the wireless router 300 at connector 332 and a wire Ethernet configured PC 352 may be connected to the wireless router 300 at connector 334 such that the wireless router 300 serves as an interface between each of the WiFi network 360, the LAN 333, the PC 352 and a cellular network to exchange network traffic between any locally reachable client device and any destination public IP address available over the cellular network.

In one example embodiment the LAN 333 may comprise a LAN server 350 and the server 350 may or may not have internet or WAN access over an ISP 362. The LAN 333 may include one or more LAN hubs 354 and other LAN client devices 356 associated with the LAN hub 354. The LAN 333 may also include individual client devices 358 such as a PC, a printer, a scanner, a camera, a media storage device, or the like. Additionally any wire Ethernet configured device such as a PC, a printer, a scanner, a camera, a media storage device, or the like, may be connected to the router at the wire Ethernet connector 334. Similarly, the WiFi network 360 may comprise various WiFi configured client devices such as, computers, computer peripherals, PDA's, telephones, audio and or video devices, etc. Generally each wire network device connected to the mobile router at the wire Ethernet connectors 332 and 334 or communicating with the WiFi AP 330 is locally reachable by the router 300.

In the case where neither the LAN 333 nor WiFi has Internet or WAN access, e.g. when the LAN 333 does not include the ISP 362, all of the network traffic received by the router 300 from a locally reachable device and having a destination IP address that is not locally reachable is directed over the cellular network interface device 316 to a cellular network. Conversely, the mobile router 300 routes any network traffic received from the cellular network to the appropriate locally reachable device.

In the case where the LAN 333 includes the ISP 362, all of the network traffic received by the router 300 from a locally reachable device and having a destination IP address that is not locally reachable may be directed over the ISP 362 as a default gateway. Except that if the ISP 362 is not available, the router 300 may be configured to redirect all non-locally reachable network traffic over the cellular network as an alternate gateway. In other examples, the router 300 may be configured to direct non-locally reachable network traffic over both the cellular network and the ISP 362 in accordance with preset rules such as directing all circuit switched data traffic over the cellular network and all packet switched data traffic over the ISO 362. Otherwise, the network traffic may be divided or load balanced according various criteria such as evenly dividing outgoing packets over each gateway or using by using dividing rules or weights based on the bandwidth or other suitability of a gateway for a particular application. In addition, each gateway may serve as a backup for all data traffic in the even that one gateway becomes unavailable. In one particularly useful application, Applicants have found that the mobile router 300 functions well as a back up to a disabled or busy ISP for time critical small data exchanges, such as for confirming credit card information at point of sale locations or at a self service kiosk or health care provider location.

WWAN

Generally the client devices 332 plus the wireless router 300 together form a Basic Service Set (BSS) of radio stations. The BSS includes one AP, which in the present example is the router wireless network interface device 318, and one or more client devices 322. Each client includes a wireless network interface device, like the device 318, and each wireless network interface device includes a radio transceiver and an antenna configured to transmit and receive radio signals in a designated range of radio frequencies. Generally, each client device 332 communicates directly with the AP 318. In the present example, the BSS forms a WLAN 360. The WLAN 360 is operated by the CPU 222, which operates the WLAN 360 to receive data packets from each of the client devices 332 and to route the data packets to a destination IP addresses embedded within a header of each data packet. In addition, the CPU 222 sends data packets to the client devices 332 if the client device IP address matches the data packet destination address.

As is customary in computer networks, each client device as well as the AP comprises a network node having a unique node ID such as the Media Access Control, (MAC) address of its network interface device. In addition, each network node may have a unique "host name" selected by a user or by a manufacturer. In addition, the entire network, (WLAN 360), has a unique network ID, which may be the MAC address or hostname of the AP, in this case, the network interface device 318. Generally, client devices 332 may enter and or leave the WLAN 360 by moving into and out of communication range of the AP or by powering on or off. However, the CPU 222 uses program steps stored in the memory device 224 to track the identity of each active client device 322 in the WLAN 360 and to add and delete devices from actives status.

In a preferred embodiment, each node of the WLAN 360 is configured as a WiFi device using radio signals in the radio frequency spectrum approximately centered around 2.4 GHz and using data packets configured and exchanged according to the WiFi communication protocol described in the IEEE 802.11 communication standard. Accordingly, the wireless router network interface device 318 includes a 2.4 GHz antenna 330, which may be housed inside an enclosure surrounding the PC board 314 or which may extend externally through an enclosure wall, e.g. wall 306. Generally, the CPU 222 performs program steps to operate the network interface device 318 as a WiFi AP that periodically broadcasts its WiFi network ID to potential client devices and functions to exchange WiFi network signals with client devices 332 within about 30-100 meters of the mobile router 300.

LAN

Generally, the mobile router 300 includes two wire network interface devices 320 and 321 for interfacing two different wire network configured devices. In the example of FIG. 3, a first wire network, LAN 333, is interfaced with the connector 332 and the first wire network interface device 320. A second wire network comprises a PC 352 which is connected with the connector 334 and the second wire network interface device 321. Alternately, the two wire network interface devices 320 and 321 can interface with any two wire network configured individual devices or any two wire LAN's.

As described above, the LAN 333 may comprise any number of client devices or nodes connected to a common wire bus. Each node of the LAN 333 includes a wire network interface device that has a unique node ID such as its Media Access Control, (MAC) address, its host name, or both. In addition, the entire LAN 333 has a network ID which may be the MAC address of the first wire network interface device 320. Generally, LAN client devices may be added and deleted to the first wire network by connecting with or disconnect from the LAN wire bus or powering on or off.

The second wire network includes two nodes, the individual device, PC 325, and the network interface device 321. Each node has a unique node ID, such as a MAC address and or host name, and the second network has a second network ID, which may be the MAC address of second wire network interface device 321. As in the first wire network, client devices may be added to and deleted from the second wire network by connecting with or disconnect from the wire network interface device 321, or by powering on or off.

In a preferred embodiment, each of the first and second wire network interface devices 320 and 321 is configured as a wire Ethernet device and each of the wire network client devices of the first and second wire networks is configured as a wire Ethernet device. Generally, each client device communicates directly with its associated wire network interface device 320 or 321. The CPU 222 operates two different wire networks to receive data packets from each wire network and to route the data packets to a destination IP addresses embedded within a header of each data packet. In addition, the CPU 222 sends data packets to each wire network client device if the client device IP address matches the data packet destination address.

Cellular Network

Generally a cellular network is any radio network made up of a plurality of radio cells. Each radio cell is served by a main transceiver, (usually fixed), known as a cell site, e.g. 328, 340 and 342. Each user of a cellular network is provided with a user transceiver, (usually mobile), and user transceivers are distributed over each of the radio cells. In the example of FIG. 3, the cellular wireless network interface device 316 is a cellular network user transceiver. Cellular network traffic including data packets are exchanged between the user transceiver 316 and one or more cell sites, 328, 340 and 342 using radio signals. In addition, cell sites may exchange data packets with one or more base station servers 364. Generally, the base station server 364 receives all incoming cellular network traffic and routes it to its destination address. If the destination address of a data packet is not locally reachable by the base station server 364, the base station forwards the data packet to a switching exchange 366 which interfaces with public and private telephone exchange networks, other cellular networks, and or computer networks, e.g. on the Internet until the destination address is reached. Accordingly, the phrase "cellular network" as used herein refers to a radio network of cell sites and user devices each having a radio transceiver configured to exchange radio signals, a base station server 364 and a switching exchange 366 for interfacing with other networks.

One example of a cellular network is a commercial cellular telephone network such as those provided in the United States by ATT Wireless, Sprint, Verizon Wireless, Cingular and T-Mobile and others. Cellular telephone network cell sites are serviced by main transceivers called cell towers and the most common user device transceivers are cellular telephones and PDA's. Generally cellular telephone radio networks communicate using radio frequencies approximately center around 1.9 GHz, however other radio frequency bands are usable. In addition, some commercial cellular telephone networks are configured to provide efficient wireless computer network services specifically tailored to provide computer network services over a WWAN.

Another example of cellular network is a restricted access radio or microwave network deployed over a campus or over an entire community or region. Restricted access radio and microwave networks include public safety networks used by law enforcement, fire, medical, military and other agencies for providing public safety and other services. Other restricted access cellular network examples include cellular networks established in seaports, airports, industrial complexes, and the like, or for communicating with a fleet of vehicles over a region. A restricted access cellular network operates the same as the cellular networks described above except that restricted access cellular networks may use different radio frequency bands such as centered around 4.9 GHz or in selected bands up to about 5.85 GHz used for high bandwidth public safety data exchanges over a restricted cellular network.

In addition, other cellular networks or WWAN's may provide open or less restricted network access to user devices configured with a microwave frequency based Worldwide Interoperability for Microwave Access, (WiMAx) or IEEE 802.16 communication standard network interface device. In particular, such cellular networks include Municipal Area Networks (MAN's) having a plurality of cell sites deployed over a municipality or campus and communicating with hundreds or thousands of user devices using selected microwave frequency bands in the range of 2-11 GHz. In particular, the WiMax bands include 2.1 and 5.8 GHz.

Referring now to FIG. 3, the example cellular network depicted therein is a commercial cellular telephone network that includes cellular towers 328, 340 and 342 each servicing a cell site extending over a geographic region approximately corresponding in size with the practical radio signal range of the cellular tower, e.g. from 0.5 miles in an obstructed area up to about 20 miles in an unobstructed area. Each cellular tower includes a radio transceiver and antenna specifically configured to simultaneously exchanging radio signals with hundreds or thousands of cellular network configured mobile or stationary user devices, (mostly cellular telephones), located within the cell. In addition, each cellular tower 328, 340, 342 may exchange radio or other signals with the base station server 364 and with other destination IP addresses beyond the switching exchange 366.

In addition, while the cellular network operates to exchange radio signals between one user device and one cellular tower 328, the signal exchange may be handed off to another cellular tower, e.g. 340 and 342 as conditions of the network change. In particular, as the location of a user device changes within a radio cell or as a user device moves to a different radio cell, a different cellular tower (e.g. 340) may provide higher signal strength or other more appropriate characteristic for handling a communication session. Generally handoffs are carefully controlled to avoid a drop or interruption in an active communications session such that some cellular telephone networks may allow a user to communicate with two cell towers simultaneously.

The mobile router 300 comprises a cellular network configured user device able to communicate with a cellular tower 328, 340, 342 over the cellular network interface device 316. As with other networks, each cellular network user device and each cellular network tower comprises a network node having a unique cellular network node ID. The node ID may comprise a device specific number, like a cellular MAC address, a telephone number, a host name, or a public or private IP address. In the present example, the cellular network interface device 318 has a MAC address used by the router 300 and a public IP address which is assigned to it by the cellular network.

Preferably the cellular network interface device 316 is configured to communicate with a cellular network using a widely available cellular communication standard such as the Evolution-Data Optimized, (EVDO) cellular communication standard, used by Sprint and Verizon Wireless in the United States, the High Speed Downlink Packet Access (HSDPA) standard, used by Cingular, or the Enhanced Data Rates for Global System Mobile Evolution (EDGE) communication standard, used by Cingular and T-Mobile in the United States. However, other cellular data standards are usable and the mobile router 300 may be configured with two or more differently configured cellular network interface devices 316 or with a cellular network interface card slot that allows a user to interchange different cellular network interface devices 316 configured to communicate with differently configure cellular networks. Preferably the cellular network interface device 316 is directly coupled to an externally mounted 1.9 GHz PCS cellular antenna 322 by a low loss microwave cable 324. Preferably the antenna 322 is pivotally supported with respect to an enclosure wall 310 by a bulkhead grommet 326 to pivot the antenna to improve signal reception. However, other cellular antenna configurations are usable including using a single antenna coupled to two separate cellular network interface devices 316.

Mobile Router

To operate as a router, the CPU 222 utilizes program steps stored in the memory module 224 to control the operation of router 300. In particular, upon power up, the CPU 222 determines which network interface devices 316, 318, 320 and 321 are installed and assigns a separate bus to each network interface device. In addition, the CPU determines the MAC address of each network interface device 316, 318, 320 and 321 and stores the MAC addresses in a routing table. The CPU 222 then assigns a non-routable network or subnet IP address and a subnet mask to each locally reachable network. These include the WiFi interface device 318 and WiFi network 360, the first Ethernet interface device 320, and the LAN 333, and the second Ethernet interface device 321, and the PC 352. Each subnet IP address comprises a network address that uniquely identifies the network. Each subnet mask IP address includes a network portion, (the subnet IP address), plus a node portion that uniquely identifies each node. The node portion may be one octet of the IP address which provides 255 non-routable private subnet IP addresses for nodes on the network or two octets can be assigned to node address to provide 65K node addresses.

In example of FIG. 3, the subnet IP address of the WiFi network is assigned the network address 192.168.100 and the first node or client device in the WiFi network is assigned the IP address 192.168.100.0. The subnet IP address of the first Ethernet network is assigned the network address 192.168.101 and the first node or client device in the first Ethernet network is assigned the IP address 192.169.101.0. Likewise, subnet IP address of the second Ethernet network is assigned the network address 192.168.102 and the first node or client device in the second Ethernet network is assigned the IP address 192.169.102.0. This addressing scheme uniquely associates each node or client device with the locally reachable network that the node is associated with.

Once the addresses are reserved, the CPU 222 then commands the WiFi network interface device 318 to communicate with any WiFi clients in the communication range of the WiFi AP 318 and to determine the MAC address of each WiFi client and assign each WiFi client with a unique subnet mask IP address. The CPU 222 then commands each wire Ethernet network interface device 320 and 321 to communicate with any wire Ethernet clients locally connected to the wireless router 300, to determine the MAC address of each Ethernet client device and to assign each Ethernet client with an appropriate unique subnet mask IP address.

Once all of the locally reachable devices are identified, the CPU 222 generates a routing table listing the MAC ID, host name, network ID and subnet mask IP address of every locally reachable device or client. The routing table is stored in the memory device 224. In addition, the routing table may also store other information related to a node such a port assignment as may be required. In addition, the CPU 222 periodically poles each network for configuration changes and updates the routing table accordingly.

After populating the routing table with the local devices, the CPU 222 then initiates steps that cause the cellular network interface device 316 to communicate with a cellular tower 328 and to establish a network connection with a cellular network. In response to the communication from the cellular network interface device 316, the cellular network assigns the cellular network interface device 316 with a temporary public IP address which is the temporary public IP address of the mobile router 300 and of every device locally reachable over the router 300. The CPU 222 then adds the public IP address to the routing table for use as the source IP address for all network traffic routed over the cellular network interface device 316.

In addition, the CPU 222 may also store instantaneous conditions of the cellular network such as an identity of the cellular tower, e.g. tower 328, the tower location, if known, the proximity of other towers, if known, etc. Moreover, the CPU 222 may calculate instantaneous conditions of the cellular network such as the signal strength of each cellular tower, the up and down load bandwidth capacity of the tower, tower response time and or other parameters of the cellular network as can be determined. All instantaneous and set conditions of the cellular network may then be stored in a database or look up table stored in the memory device 224 and used by the CPU 222 to select routing paths. Moreover, the CPU 222 periodically poles the cellular network for configuration changes and updates of the instantaneous and set conditions of the cellular network and updates any databases or tables stored in the memory device 224.

Generally, the router 300 receives network traffic from locally reachable devices and uses Network Address Translation, (NAT) and or Network Address Port Translation, (NAPT) to route traffic from locally reachable devices to pubic IP address destinations over the cellular network. In particular the router 300 has a single public IP address assigned to the network interface device 318 by the cellular network. As network traffic passes from the locally reachable devices to the router and then to public IP address destinations reachable over the cellular network, the CPU 222 translates each data packet on the fly to remove its locally reachable source address and local port assignment and replace these with the public IP address of the network interface device 318 and an assigned return port. In addition, the CPU 222 and memory device 224 are programmed to track basic information about outgoing packets (particularly the local IP address, local port assignment, destination IP address and assigned return port) and to store the outgoing packet information in the routing table or other database. Accordingly, when a reply packet from the destination IP address returns to the router 300 over the assigned return port, the CPU 222 accesses the outgoing packet information stored in the routing table or database and re-translates the reply packet to insert the local source IP address and local port assignment and routes the reply packet accordingly.

In particular, each data packet is formatted with a header at the beginning of the packet, a payload, containing the information to be carried, and a trailer marking the end of the packet. The header generally includes instructions to the router. The instructions include the packet source IP address the packet destination IP address and may include a local port assignment. Upon receiving a packet, the CPU 222 reads the source and destination IP addresses and determines if the destination IP address is a locally reachable address by searching the routing table. If the destination IP address is locally reachable, the packet is routed to the destination IP address without changing the header information. If the destination IP address is not locally reachable, the packet header information is modified by the CPU 222. In particular, the packet local source IP address is removed and replaced by the public IP address assigned to cellular network interface device 316. Accordingly, the public IP address assigned to cellular network interface device 316 is used as the source IP address for every packet sent over the cellular network. The CPU 222 also assigns the packet a unique return port, adds the return port ID to the packet header and logs the packet destination address, return port assignment, local IP address and local port assignment if one was included, into the routing table or into a packet tracking database or table as required. Thereafter, any reply packet received from the destination IP address over the assigned return port is immediately routed to the local IP address over the local port assigned to the session. Accordingly, the mobile router 300 acts as a network interface between one or more local networks and or individual devices and a cellular network to route data packets from locally reachable devices to any public IP address reachable by the cellular network.

Mobile Router Stack

Figure 4:
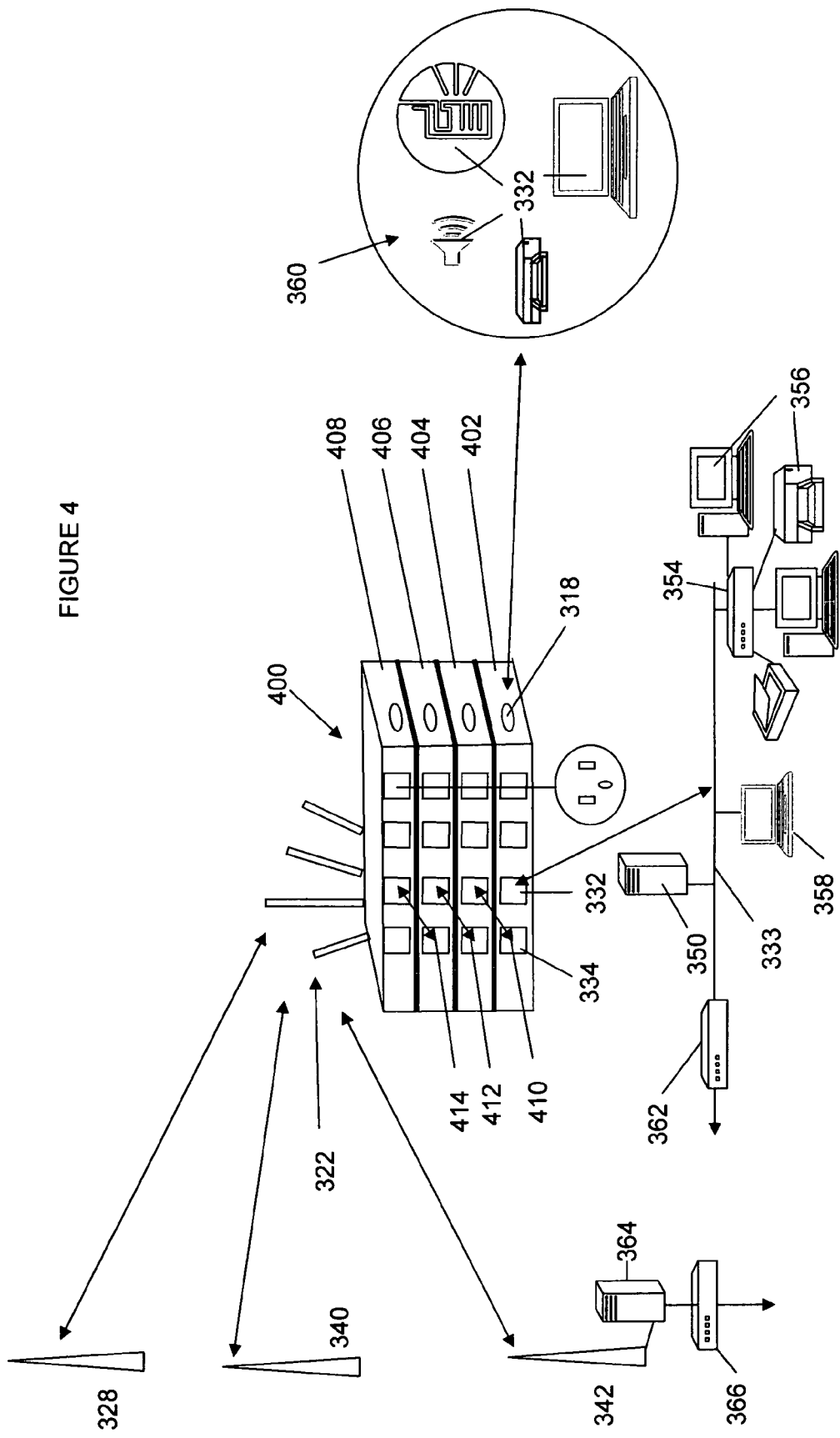
FIG. 4 illustrates a schematic representation of a stack of mobile routers configured according to another aspect of the present invention.

Referring now to FIGS. 3 and 4, a plurality of mobile routers, each configured substantially like the mobile router 300, shown in FIG. 3 and described above, are stacked together in a stack 400. In particular, the stack 400 includes a master router 402 and one or more substantially identical slave-routers 404, 406 and 408. The routers may be held in a stack configuration e.g. by a stack holder such as a rack or bracketing element, not shown. Each router in the stack includes a power connector 336 separately plugged into a power source; however other power delivery options are usable. Each router in the stack includes a cellular network interface device 316 and an externally disposed cellular antenna 322. Each router in the stack may include a WiFi network interface device 318, however, in the stack 400, only the master router 402 establishes the WALN 360. Accordingly, none of the slave routers 404-408 need to include a WiFi network interface device 318. The stack 400 may comprise two routes, e.g. 402 and 404 with one master router 402 and one slave router 404. Alternately, the stack 400 may one master router 402 combined with number of slave routers. Additionally, each router in the stack may include two or more cellular network interface devices 316 directly interfaced with the local CPU and operating substantially like the cellular network interface 316 as described above and below.

Each router 402-408 includes two wire Ethernet connectors 332 and 334 with each connector 332 being associated with a first wire Ethernet network interface device 320 and with each connector 334 being associated with a second wire Ethernet network interface devices 321. In the stack configuration, a wire Ethernet configured jumper wire 410 connects the master router second Ethernet network interface device 321 with the first Ethernet network interface device 320 of the first slave router 404. Additionally, wire Ethernet configured jumper wires 412 and 414 connect the second Ethernet network interface device 321 of the slave router 404 with first Ethernet network interface device 320 of the slave router 406 and the second Ethernet network interface device 321 of the slave router 404 with the first Ethernet network interface device 320 of the slave router 408. In this manner, the stack 400 comprises an Ethernet network with each router 402, 404, 406 and 408 comprising a network node.

Generally each router 300 includes program steps stored in the memory module 224 for operating as either a master router or a slave router. To set up a router stack, a user may interface with CPU 222 using an external computer in communication with the CPU 222. The user may use the external computer to access the routers user menu stored on the memory module 224. The router user menu can be used to configure each router as a master router or a slave router. Moreover, the user menu can be used to assign each router in a stack a device number and according to the present invention setting a router to device number 1 configures the router as a master router and setting the device number to higher numbers configures a router as a slave router. Generally, if a customer orders a router stack, the configuration of each router can be preset prior to shipment and the stack 400 can be shipped assembled. Alternately, if a use desired to set up a stack 400 using single routers, the CPU 222 of each router can determine if the router is associated with a stack 400, determine its position in the stack 400 and configure itself as a master router or a slave router as required.

As stated above, upon power up, the CPU determines which network interface devices 316, 318, 320 and 321 are installed and assigns a separate bus to each network interface device. In addition, the CPU determines the MAC address of each network interface device 316, 318, 320 and 321 and stores the locally reachable MAC addresses in a routing table. In addition, the CPU 222 determines if the second Ethernet network interface device 321 is interfaced with another router 300 and if so determines its position in the stack and sets its configuration as a master router 402 or a slave router 404-408 as required.

With the router 402 set as a master router and any other routers in the stack configured as slave routers, the master router 402 operates as described above to establish the WiFi network 360 and an Ethernet network with whatever devices are interfaced with the master router first Ethernet network interface device 320, e.g. the LAN 333, shown in FIG. 4. The master router 402 assigns a non-routable network or subnet IP address and a subnet mask to each locally reachable network including the WiFi interface device 318 and WiFi network 360 and the first Ethernet interface device 320, and the LAN 333. Since the second Ethernet interface device 321 is interfaced with the slave router 402, the slave router 404 is treated as if it was another cellular network interface device 316. Similarly any other slave routers 406 and 408 in the stack are treated as if there were cellular network interface devices 316.

Thus each stack 400 includes at least one cellular network interface device 316 per router such that a stack of two routers effectively doubles the cellular network bandwidth that the router stack can gain access to. In the stack 400, the master router 402 has up to four times the cellular network bandwidth available to it as compared to a single router 300. Accordingly a stack 400 can route as much as four times the network traffic over a cellular network as a single router 300 because the stack 400 utilizes four cellular network interface devices 316.

In the stack 400, the master router 402 determines that there are four cellular network interface device 316 installed in the stack and initiates steps that cause each of the four network interface device 316 to communicate with a cellular tower 328 and to establish a separate network connection with a cellular network. In response to the communication from each of the four cellular network interface devices 316, the cellular network assigns each cellular network interface device 316 with a temporary public IP address. The master router 402 then receives the temporary public IP address of each cellular network interface device 316 in the stack and stores each public IP address in its routing table as a potential source address usable for outgoing network traffic.

Accordingly the master router 402 constructs a routing table with the node ID of every device that is locally reachable by the master router 402 and with the public IP address of each cellular network interface device 316 in the stack 400. Thus the stack 400 has four public IP addresses usable to exchange network traffic with the cellular network. Moreover, the cellular network treats the stack 400 as if it were four different independent client devices. Thus as the stack moves through a cell site or moves from one sight to another, the cellular network controls handoffs and communication session changes with the four cellular network interface device 316 independently. This has the advantage that while a communication session with on cellular network interface device 316 may be dropped, other cellular network interface device 316 will remain connected and available to reroute outgoing network traffic.

In operation, the master router 402 receives network traffic from locally reachable devices and uses Network Address Translation, (NAT) and or Network Address Port Translation, (NAPT) to route traffic from locally reachable devices to pubic IP address destinations over all four connections with the cellular network. In particular, the master router 300 has four public IP addresses available to assign as a source IP address to an outgoing network packet. Moreover, since any reply packets are delivered back to the source IP address assigned to an outgoing packet, reply packets are also received over all four connections with the cellular network. This allows the master router to use any suitable scheme to divide or load balance the outgoing network traffic over the four channels and or to shift the outgoing network traffic to the best available channels as required.

As shown in FIG. 4, any locally reachable client devices are connected to the master router 402. Network traffic from one locally reachable device to another locally reachable device flows through the master router CPU 222. The master router CPU 222 checks destination address of each data packet against its routing table and if the destination address is locally reachable, the CPU 222 routes the data packet to the appropriate locally reachable destination address. If the data packet destination address is not locally reachable, the master router CPU 222 uses a routing algorithm and or data stored in the routing table to select which of the four available cellular network connections to route the data packet over. Once the outgoing packet is assigned to a cellular network connection, the master router CPU 222 translates the packet by replacing the data packet source IP address and local port assignment with the public IP address assigned to the selected cellular network connection and a return port assignment. The packet is then routed the cellular network interface device 316 associated with the assigned cellular network connection. Accordingly, the packet may be routed to the cellular network interface device 316 installed in the master router 402 or to the cellular network interface device 316 installed in any one of the slave router 404-408 over the Ethernet connections made with each slave router. In addition the master router CPU 222 is programmed to track basic information about each outgoing packet, particularly the local source IP address and local port assignment removed from the packet, the non-local destination IP address and return port assignment. In particular, information about each outgoing packet is stored in the master router memory device 224. Outgoing packet information may be added to the routing table or may be stored in a separate packet tracking database. Accordingly, for each data packet send over the cellular network, the master router CPU 222 updates a table or database with the packet local source IP address, local port assignment, destination IP address, return port assignment and assigned public source IP address.

Each reply packet returned to the stack 400 is received by a cellular network interface device 316. If the reply packet is received by a slave router, the clave router CPU routes the packet over the wire Ethernet connections to the master router CPU 222. The master router CPU then reads the packet to determine its source IP address and return port assignment. The master router CPU 222 then compares the reply packet information with the outgoing packet information stored in the routing table or packet tracking database to find matching outgoing packet. The master router CPU 222 then retranslates the reply packet to replace the public IP destination address and return port assignment with the appropriate locally reachable IP address and local port assignment stored in the outgoing packet information stored in the routing table or packet tracking database. The packet is then routed to the appropriate locally reachable device.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. a mobile network router, those skilled in the art will recognize that its usefulness is not limited thereto and that the present invention can be beneficially utilized in any number of environments and implementations including but not limited to any network environment. Accordingly, the claims set forth below should be construed in view of the full breadth and spirit of the invention as disclosed herein.

What we claim:

1. A stack of wireless network routers comprising:
a master router comprising a first CPU for performing program steps, a first memory module in communication with the first CPU, a first and a second wire network interface device each in communication with the first CPU and each configured as a host network access point (AP) for communicating with locally reachable client devices using a wire local area network (LAN) communication protocol, and a wireless network interface device in communication with the first CPU and configured as a host network access point (AP) for communicating with locally reachable client devices using a wireless local area network (LAN), a cellular network interface device in communication with the first CPU wherein the cellular network interface device in communication with the first CPU is configured to connect to a host cellular network reachable thereby using a radio frequency band and cellular network communication protocol matched to the host cellular network and to become a client of the host cellular network and exchange network communication signals between the first CPU and the host cellular network;

one or more slave routers each comprising a second CPU for performing program steps, a second memory module in communication with the second CPU, a first and a second wire network interface device each in communication with the second CPU and each configured as a host network access point (AP) for communicating with locally reachable client devices using a wire local area network (LAN) communication protocol, and a cellular network interface device in communication with the second CPU wherein the cellular network interface device in communication with the second CPU is configured to connect to the host cellular network reachable thereby using a radio frequency band and cellular network communication protocol matched to the host cellular network and to become a client of the host cellular network and exchange network communication signals between the second CPU and the host cellular network;

a first wire jumper connected between the first wire network interface device of the master router and the second wire network interface device of one of the one or more slave routers for exchanging network communication signals between the second CPU and the first CPU over a wire LAN using a wire LAN communication protocol; and, one or more second wire jumpers connected between the first wire network interface device of each of the one or more slave routers and the second wire network interface device of another of the one or more slave routers for exchanging network communication signals between interconnected second CPU is over a wire LAN using a wire LAN communication protocol.

2. The stack of claim 1 wherein the wireless network interface device in communication with the first CPU is configured as a WiFi access point.

3. The stack of claim 1 wherein each of the first and second wire network interface devices is configured as a wire Ethernet node.

4. The stack of claim 1 wherein the master router further comprises one or more additional cellular network interface devices in communication with the first CPU, wherein each of the one or more additional cellular network interface devices in communication with, the first CPU is configured to connect to the host cellular network reachable thereby using a radio frequency band and cellular network communication protocol matched to the host cellular network and to become a client of the host cellular network and exchange network communication signals between the first CPU and the host cellular network.

5. The stack of claim 4 wherein at least one of the one or more slave routers further comprises one or more additional cellular network interface devices in communication with the second CPU wherein each of the one or more additional cellular network interface devices in communication with the second CPU is configured to connect to the host cellular network using a radio frequency band and cellular network communication protocol matched to the host cellular network and to become a client of the host cellular network and exchange network communication signals between the second CPU and the host cellular network.

6. The stack of claim 5 wherein the host cellular, network comprises a plurality of host cellular networks using one of different radio frequency bands and different cellular network communication protocols and further wherein the plurality of first and second cellular network interface devices includes at least one cellular network interface device corresponding with, and configured to become a client of, each of the plurality of host cellular networks.

7. The stack of claim 1 wherein the host cellular network comprises a plurality of host cellular networks using one of different radio frequency bands and different cellular network communication protocols and further wherein the plurality of first and second cellular network interface devices includes at least one cellular network interface device corresponding with, and configured to become a client of, each of the plurality of host cellular networks.

8. The stack of claim 1 wherein at least one of the one or more slave routers further comprises one or more additional cellular network interface devices in communication with the second CPU wherein each of the one or more additional cellular network interface devices in communication with the second CPU is configured to connect to the host cellular network using a radio frequency band and cellular network communication protocol matched to the host cellular network and to become a client of the host cellular network and exchange network communication signals between the second CPU and the host cellular network.

* * * * *